United States Patent
Agarwal et al.

(10) Patent No.: US 11,429,360 B1
(45) Date of Patent: Aug. 30, 2022

(54) COMPUTER ASSISTED PROGRAMMING WITH TARGETED VISUAL FEEDBACK

(71) Applicant: International Business Machines Corporation, Armonk, NY (US)

(72) Inventors: Mayank Agarwal, Somerville, MA (US); Kartik Talamadupula, Seattle, WA (US); Justin David Weisz, Scarsdale, NY (US); Stephanie Houde, Belmont, MA (US); Fernando Carlos Martinez, La Plata (AR); Michael Muller, Medford, MA (US); John Thomas Richards, Honeoye Falls, NY (US); Steven I. Ross, S. Hamilton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/322,559

(22) Filed: May 17, 2021

(51) Int. Cl.
*G06F 9/44* (2018.01)
*G06F 8/51* (2018.01)
(Continued)

(52) U.S. Cl.
CPC ............... *G06F 8/51* (2013.01); *G06F 8/33* (2013.01); *G06F 11/3608* (2013.01); *G06N 20/00* (2019.01)

(58) Field of Classification Search
None
See application file for complete search history.

(56) References Cited

U.S. PATENT DOCUMENTS

| 7,089,270 B2 * | 8/2006 | Ren .................. G06F 8/658 707/999.203 |
| 7,209,875 B2 | 4/2007 | Quirk et al. |

(Continued)

FOREIGN PATENT DOCUMENTS

| CN | 103942143 A | 7/2014 |
| CN | 104615540 A | 5/2015 |
| CN | 110795326 A | 2/2020 |

OTHER PUBLICATIONS

Mell et al., "The NIST Definition of Cloud Computing," National Institute of Standards and Technology Special Publication 800-145, Sep. 2011, 7 pages, United States.

(Continued)

*Primary Examiner* — Qamrun Nahar
(74) *Attorney, Agent, or Firm* — Sherman IP LLP; Kenneth L. Sherman; Steven Laut (57) ABSTRACT

A method of using artificial intelligence to provide source code from an original programming language in a target programming language showing regions of low confidence. The method includes receiving, by a computing device, a code base in an original programming language. The computing device further provides the code base in the original programming language to a target programming language using an artificial intelligence tool. The computing device additionally displays the code base in the target programming language using a visualization tool in a visual interface. The computing device still further displays the regions of uncertainty to a human user in the visual interface. The regions of uncertainty provide low confidence regions of the code base in the target programming language for targeted user intervention. The regions of low confidence correlate with violations to provide displayed actionable insight regions.

20 Claims, 8 Drawing Sheets

(51) Int. Cl.
*G06N 20/00* (2019.01)
*G06F 11/36* (2006.01)
*G06F 8/33* (2018.01)

(56) References Cited

U.S. PATENT DOCUMENTS

| | | |
|---|---|---|
| 7,587,307 B2 | 9/2009 | Cancedda et al. |
| 9,164,985 B1 | 10/2015 | Viswanatha |
| 10,409,919 B2 | 9/2019 | Rubin |
| 10,452,785 B2 | 10/2019 | Murakami |
| 10,467,261 B1 * | 11/2019 | Doyle .................. G06F 16/248 |
| 10,552,547 B2 * | 2/2020 | Anglin .................. G06N 20/00 |
| 2014/0358524 A1 | 12/2014 | Papula et al. |
| 2018/0150550 A1 * | 5/2018 | Sharma .................. G06F 9/451 |
| 2021/0011694 A1 * | 1/2021 | Ni ............................ G06F 8/51 |

OTHER PUBLICATIONS

Lachaux, M-A et al., "Unsupervised Translation of Programming Languages," downloaded May 3, 2021: https://arxiv.org/pdf/2006.03511.pdf, Jun. 5, 2020, pp. 1-21, United States.
Fomicheva, M. et al., "Unsupervised Quality Estimation for Neural Machine Translation," Transactions of the Association for Computational Linguistics, downloaded May 3, 2021: https://aixiv.org/pdf/2005.10608.pdf, Sep. 8, 2020, pp. 539-555, United States.
(Grace Period Disclosure): Agarwal, M. et al., "Quality Estimation & Interpretability for Code Translation," NeurIPS 2020 Workshop CAP Blind Submission (virtual), Oct. 13, 2020, 8 pages, imported Dec. 8, 2020, United States.

* cited by examiner

```
┌─────────────────────────────────────┐
│  Receiving A Code Base In An Original│
│       Programming Language           │
│                410                   │
└─────────────────────────────────────┘
                  │
                  ▼
┌─────────────────────────────────────┐
│  Providing The Code Base In The Original│
│  Programming Language To A Target    │
│  Programming Language Using An       │
│  Artificial Intelligence Tool 420    │
└─────────────────────────────────────┘
                  │
                  ▼
┌─────────────────────────────────────┐
│  Displaying The Code Base In The Target│
│  Programming Language Using A        │
│  Visualization Tool In A Visual Interface│
│                430                   │
└─────────────────────────────────────┘
                  │
                  ▼
┌─────────────────────────────────────┐
│  Displaying Further The Regions Of Uncertainty│
│  To A Human User In The Visual Interface│
│                440                   │
└─────────────────────────────────────┘
```

COMPUTER ASSISTED PROGRAMMING WITH TARGETED VISUAL FEEDBACK

STATEMENT REGARDING PRIOR DISCLOSURES BY THE INVENTOR OR A JOINT INVENTOR

The following disclosure is submitted under 35 U.S.C. 102(b)(1)(A): DISCLOSURE: Quality Estimation & Interpretability for Code Translation, NeurIPS 2020 Workshop CAP Blind Submission (virtual), Mayank Agarwal, Kartik Talamadupula, Stephanie Houde, Fernando Martinez, Michael Muller, John Richards, Steven Ross, Justin Weisz, Oct. 13, 2020, imported Dec. 8, 2020.

BACKGROUND

The field of embodiments of the present invention relates to integrating generative artificial intelligence (AI) based translation systems with specific visual cues on a proposed translation indicating regions where user intervention is required.

Computer assisted programming or AI for code (AI4Code) is an emerging field of focus for both research and business communities. AI4Code aims to integrate recent advances in AI to various sub-tasks in the programming domain. Code translation is one such avenue, where the aim is to automate the translation of code from one programming language to another. It is useful in porting code bases written in legacy programming languages to a modern programming language, among others.

SUMMARY

Embodiments relate to integrating artificial intelligence (AI) based translation systems with specific visual cues on a proposed translation indicating regions where user intervention is required. One embodiment provides a method of using AI to provide source code from an original programming language in a target programming language showing regions of low confidence. The method includes receiving, by a computing device, a code base in an original programming language. The computing device further provides the code base in the original programming language to a target programming language using an AI tool. The computing device additionally displays the code base in the target programming language using a visualization tool in a visual interface. The computing device still further displays the regions of uncertainty to a human user in the visual interface. The regions of uncertainty provide the regions of low confidence of the code base in the target programming language for targeted user intervention, and the regions of low confidence correlate with violations to provide displayed actionable insight regions. The embodiments significantly improve programming code translations. As a result, the embodiments significantly improves programming code translation by integrating AI based translation with specific visual cues on the proposed translation indicating regions where user intervention is required. Some features contribute to the advantage of identifying regions of uncertainty that matches with the programmer's mental model of code through a high correlation with lint errors and violations.

One or more of the following features may be included. In some embodiments, the method may further include receiving, by the computing device, recommendation selections from the visualization tool regarding the regions of uncertainty.

In some embodiments, the method may additionally include displaying, by the computing device, an updated code base in the targeted programming language to the visual interface considering the received recommendation selections from the visualization tool regarding the regions of uncertainty.

In one or more embodiments, the method may further include that the code base in the original programming language and the code base of the target programming language are formatted in a side-by-side display of the visual interface.

In some embodiments, the method may include that the violations are lint violations.

In one or more embodiments, the method may further include each line of the code base in the target programming language including a confidence indication from an artificial intelligence model.

In some embodiments, the method may include that each line of the code base of the target programming language is flagged by the artificial intelligence model for a lint violation including a lint violation indication.

These and other features, aspects and advantages of the present embodiments will become understood with reference to the following description, appended claims and accompanying figures.

BRIEF DESCRIPTION OF THE DRAWINGS

FIG. 1 illustrates an example embodiment display of an original code sample and the translated code sample that are displayed side-by-side, and where the relevant sections of translated code are highlighted for user intervention, according to one embodiment;

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to integrating generative artificial intelligence (AI) based translation systems with specific visual cues on a proposed translation indicating regions where user intervention is required. One embodiment provides a method of using AI to provide source code from an original programming language to a target programming language showing regions of low confidence. The method includes receiving, by a computing device, a code base in an original programming language. The computing device further provides the code base in the original programming language to a target programming language using an AI tool. The computing device additionally displays the code base in the target programming language using a visualization tool in a visual interface. The computing device still further displays the regions of uncertainty to a human user in the visual interface. The regions of uncertainty provide the regions of low confidence of the translated code base in the target programming language for targeted user intervention, and the regions of low confidence correlate with violations to provide displayed actionable insight regions.

One or more of the following features may be included. In some embodiments, the method may further include receiving, by the computing device, recommendation selections from the visualization tool regarding the regions of uncertainty.

In some embodiments, the method may additionally include displaying, by the computing device, an updated code base of the target programming language to the visual interface considering the received recommendation selections from the visualization tool regarding the regions of uncertainty.

In one or more embodiments, the method may further include that the code base in the original programming language and the code base of the target programming language are formatted in a side-by-side display of the visual interface.

In some embodiments, the method may include that the violations are lint violations.

In one or more embodiments, the method may further include each line of the code base of the code in the target programming language includes a confidence indication from an artificial intelligence model.

In some embodiments, the method may include that each line of the code base of the target programming language is flagged by the artificial intelligence model for a lint violation includes a lint violation indication.

One or more embodiments relate to machine learning (ML) models or algorithms that employ one or more AI models or algorithms. AI models may include a trained ML model (e.g., models, such as an NN, a CNN, a recurrent NN (RNN), a Long short-term memory (LSTM) based NN, gate recurrent unit (GRU) based RNN, tree-based CNN, KNN, a self-attention network (e.g., a NN that utilizes the attention mechanism as the basic building block; self-attention networks have been shown to be effective for sequence modeling tasks, while having no recurrence or convolutions), BiLSTM (bi-directional LSTM), etc.). An artificial NN is an interconnected group of nodes or neurons.

One or more embodiments may be implemented for an example scenario as follows. A task is considered as an organization or an individual developer attempting to translate code from one language to another. Conventional techniques involve the following: a developer reads and understands the code in the original programming language; the developer starts translating the original code based on his/her understanding of the original code; and the developer runs and verifies that the translation is accurate or not. In one embodiment, the developer is presented with an initial version of automatically translated code, along with regions of uncertainty where the translation system (AI, or any other system) believes human intervention is required. The developer focuses on these regions of uncertainty to determine if changes are required to make the translated code usable or not. In one embodiment, the developer chooses among options provided by the translation system, optionally indicating an acceptable version, and inserting that acceptable version with a single user-operation. The developer runs and verifies that the translation is accurate.

With conventional techniques, code translation systems produce an output code in the target language given the source code in the original programming language. There is a need to measure the quality of output code from the translation system to understand how good or bad the translation is. From a programmer's point-of-view, the quality of code depends on a variety of factors, some of which are, syntactic correctness, logical errors in the code, conformity to coding styles, among others. Linters are tools frequently used by programmers to check for some issues or enforce coding standards in the given piece of code. This provides a natural relationship between the translation system's confidence in its output and the programmer's mental model of code quality. In one or more embodiments, the features contribute to the advantage of a system for code translation that provides identification of regions of uncertainty that matches with the programmer's mental model of code through a high correlation with lint errors and violations.

FIG. 1 illustrates an example embodiment display of an original code sample 110 and the translated code sample 120 that are displayed side-by-side, and where the relevant sections of translated code are highlighted for user intervention, according to one embodiment. In this example embodiment, the original code sample 110 is in JAVA® code 115 that is selected to be translated to PYTHON® code 125. The highlighted translated code sample 120 indicates where a user or programmer is directed to inspect for potential or actual issues in translation. The example embodiment displayed in FIG. 1 may be displayed by a visualization tool or application.

In conventional code translation models there is little correlation between the confidence measures output by the code translation model and traditional methods used by software engineers to check their code (such as lint, which is a tool that analyzes source code to flag potential errors). Since interest lies in evaluating this correlation, it must first be determined what the two variables being correlated are. In one embodiment, a first such variable is continuous, and is simply the output from the translation model for each token in the translated source code: p $(y_t|y<t,x,\theta)$. The second variable is discrete/categorical; and takes the form of the error category that is flagged for a given line by running the translated source code through a linter. In one example embodiment, the data used is a number of common algorithmic implementations (e.g., 400, etc.) in JAVA® downloaded from a repository, etc, and produce a translation (e.g., to a newer version of the language, such as PYTHON® 3.0) for each of these instances using a pre-trained translation coder (TransCoder) model with a beam size of five (5). For each translation, the output probabilities associated with each token are recorded. It should be noted that a central shortcoming with models such as the TransCoder model is that human users do not have a good understanding of how the model performs the translation; and hence have little idea about when and why it has confidence (or not) in a particular token. An important reason for this shortcoming is the difference in the way that humans generate translations versus neural models.

Figure 2:
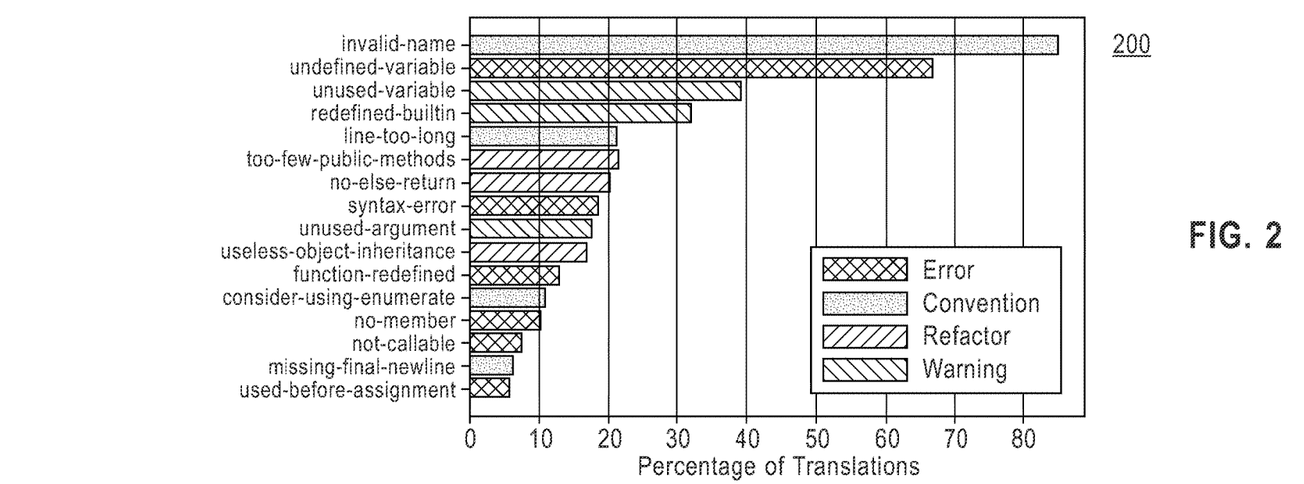
FIG. 2 illustrates an example of lint violations that occur for more than 5% of the translations and the percentage of translations in which they occur, according to one embodiment.

FIG. 2 illustrates an example 200 of lint violations that occur for more than 5% of the translations and the percentage of translations in which they occur, according to one embodiment. For the example 200, 400 PYTHON® 3.0 translations produced by the TransCoder model through the static code analysis tool is used to search for programming errors, coding standard violations, and simple refactoring suggestions. A static code analysis tool that looks for errors is executed to validate for all but three of the many violations (e.g., 311, etc.) included in the default tool configuration. Some of these validations are checks for proper syntax, package import errors, undefined variable access or usage before assignment, redefining PYTHON® built-in functions or variable; among others.

Figure 3:
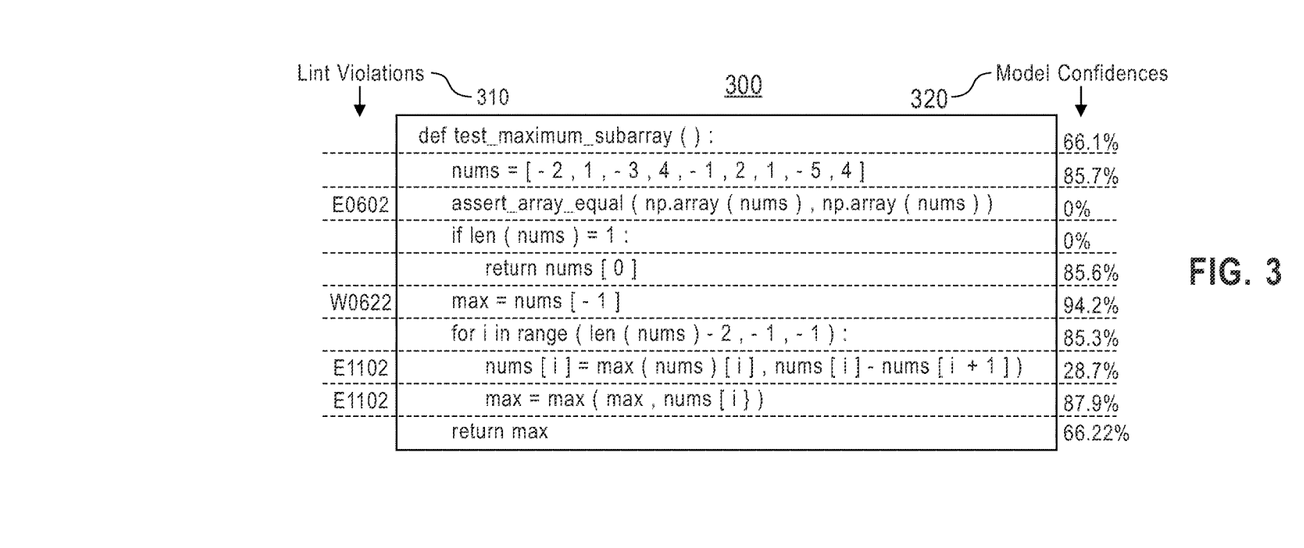
FIG. 3 illustrates an example display of a code snippet translated from one language to another with the corresponding errors and model confidences for each line, according to one embodiment.

FIG. 3 illustrates an example display 300 of a code snippet translated from one language to another with the corresponding errors (lint violations 310) and model confidences 320 for each line, according to one embodiment. For the correlation analysis, the Point Biserial Correlation Coefficient (PBCC) is used. The PBCC metric is typically used in scenarios where one variable is dichotomous—that is, it can be partitioned into two mutually exclusive sets that are jointly exhaustive—and the other variable is continuous. The biserial correlation is when the variable is artificially dichotomized over some underlying continuity. In one embodiment, the dichotomous variable is whether a particular line of source code throws a linter error (of a specific category) or not. The continuous variable is taken to be an estimate of the model's uncertainty for the corresponding source code line. In one embodiment, two specific uncertainty metrics are considered: $\gamma_{joint}$ computing the uncertainty based on the joint distribution over the T tokens in the line; and $\gamma_{min}$ using the minimum token confidence value as an estimate of the line uncertainty:

$$\Upsilon_{joint} = 1 - \prod_{t=1}^{T} p(y_t | y < t, x, \theta) \quad \text{Eq. 1}$$

$$\Upsilon_{min} = 1 - \min_{\forall t \in \{1,\ldots,T\}} p(y_t | y < t, x, \theta). \quad \text{Eq. 2}$$

In one embodiment, the focus is on three main results: (1) a translation error analysis that offers a profile of the kinds of lint errors that occur in code translated by a TransCoder model; (2) a quantitative study of the correlation (or lack thereof) between model confidence values and lint errors; and (3) a qualitative example that drills deeper into one specific translation, and the correlations between the TransCoder model's confidence values and the lint errors for that translation.

To understand how the TransCoder model handles the syntactic differences between two programming languages (e.g., JAVA® and PYTHON® 3.0), the different kinds of lint violations that occur in the translated code are identified. Returning to FIG. 2, the top lint violations (out of the 66 observed) and the frequency with which they occur in the generated translations are shown in example 200. The most frequently-occurring violation was invalid-name, where the model did not comply with the naming convention of a function or a variable name. Similarly, line-too-long occurred in about 20% of the translations, where the TransCoder model violated the recommended 80 character line length. Other violations that occurred frequently were undefined-variable (67%), unused-variable (39%), and redefined-builtin (32%); indicating that common programming conventions—to either not define an unused variable, or where built-ins could be overridden but were advised not to—were violated by the model. These violations tie back to user insight, where participants expected the translated code to adhere to the conventions of the target language. Similarly, in the case of code translation, while function-level translation through a TransCoder model achieves around 60% accuracy (with a beam size of 5), translating whole classes requires models to account for auxiliary code and inter-function dependencies.

It should be noted that there is a need for interpretable model confidence values, to better help users focus on syntactical or conventional issues. To study the correlation between model confidences and lint violations through the static code analysis tool, PBCC values for the two uncertainty metrics defined in Equations 1 and 2 are computed. No correlation between model confidence, $p(y_t|y<t,x,\theta)$, and tokens which resulted in lint violations. In one embodiment, only the decoder output probabilities are used to identify low confidence tokens. The results underline the need for further work on metrics that better align with human perception of code translation.

Returning to FIG. 3, a code snippet is translated from JAVA® to PYTHON® 3.0 with the corresponding static code analysis tool errors and model confidences for each line. The max variable is used by the TransCoder model output both as a variable and as the maximum operator. Little correlation is visible between model confidences 320 and lint violations 310. The specific translation instance along with lint violations 310 and model confidences 320 serves as an illustrative example of the nature of lint violations 310 that occur in translated code, and how the model confidences 320 values vary across the translation. While the TransCoder model correctly translates most of the code, including an interesting translation of i>=0 in JAVA® to -1 in PYTHON® 3.0 in the for loop condition, it is unable to distinguish between the Math.max operator and max variable in JAVA®—both of which have the same name but are different entities—and translates them over to the same variable but performing both functions in PYTHON® 3.0 (see lint violations 310 W0622 and E1102). The corresponding model confidences 320 show some correlation with the lint violations 310 with low confidences for E0602 and E1102 violations; but also show high confidences for W0602 and the second E1102 violation. This illustrates that model confidences do not correlate with associated programming errors or standards violations.

In one embodiment, automated code translation is viewed from the perspective of a programmer. From a user study, it is found that the syntax and styling of the translation also matters to the users along with the code's executability and correctness; and an analysis of translations from the TransCoder model underscored the need for incorporating coding standards in the translation process. Additionally, users also desired some form of interpretability of the model's confidence in certain tokens. To quantitatively assess any correlation, in one embodiment the token probability values are used as a measure of the model's confidence, and lint violations as a surrogate metric for code interpretability. No significant correlation is found.

Figure 4:
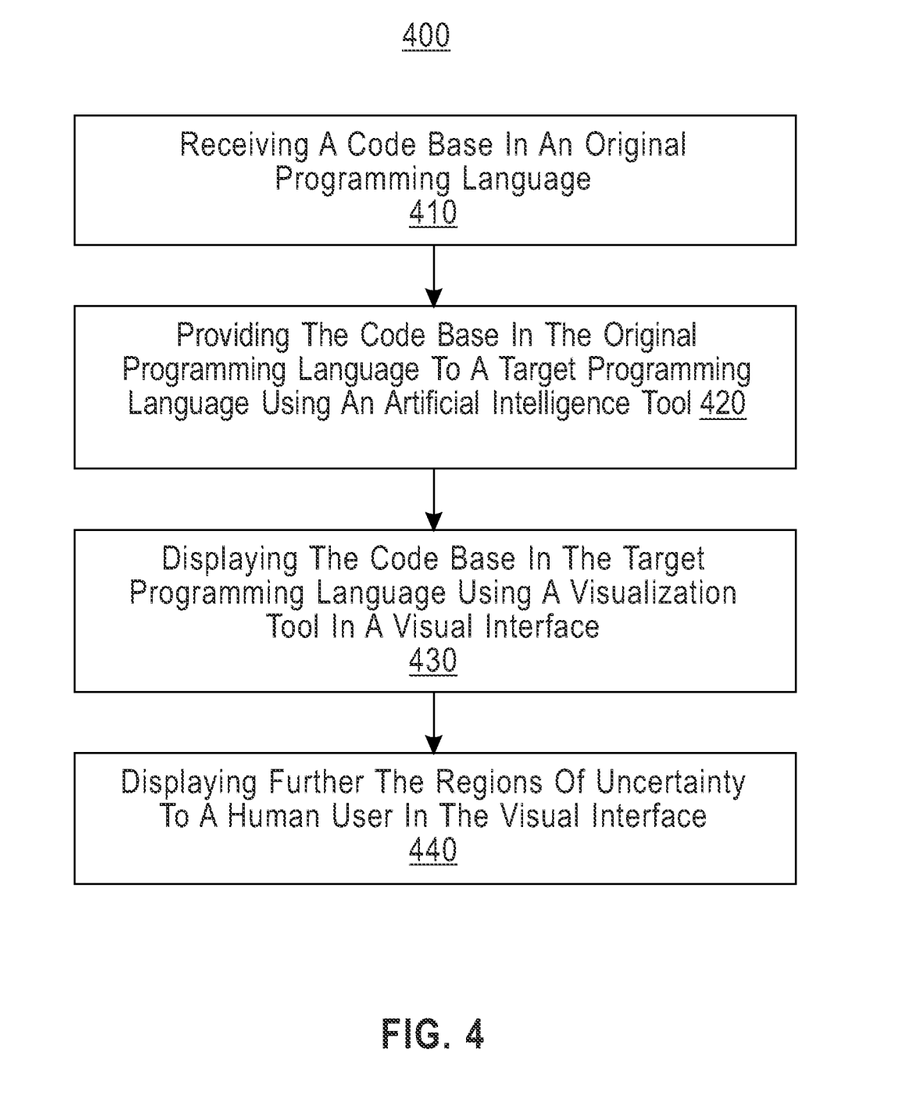
FIG. 4 illustrates a block diagram of a process for using artificial intelligence (AI) that provides source code from an original programming language to a target programming language showing regions of low confidence, according to one embodiment.

FIG. 4 illustrates a block diagram 400 of a process for using AI that provides source code from an original programming language to a target programming language showing regions of low confidence, according to one embodiment. In one embodiment, in block 410, process 400 receives, by a computing device (from computing node 10, FIG. 5, hardware and software layer 60, FIG. 6, processing system 700, FIG. 7, system 800, FIG. 8, system 900, FIG. 9, etc.) a code base in an original programming language. In block 420, process 400 further includes providing, by the computing device, the code base in the original programming language to a target programming language using an AI tool (e.g., FIG. 1). In block 430, process 400 further provides displaying, by the computing device, the code base in the target programming language using a visualization tool in a visual interface (see e.g., translated code sample 120, FIG. 1, display 300, FIG. 3). In block 440, process 400 additionally provides displaying further, by the computing device, the regions of uncertainty to a human user in the visual interface (see e.g., translated code sample 120, FIG. 1, display 300, FIG. 3). The regions of uncertainty provide the regions of low confidence of the code base in the target programming language for targeted user intervention, and the regions of low confidence correlate with violations to provide displayed actionable insight regions.

In one embodiment, process 400 may further include receiving, by the computing device, recommendation selections from the visualization tool regarding the regions of uncertainty.

In some embodiments, process 400 may still further include displaying, by the computing device, an updated code base in the targeted programming language to the visual interface considering the received recommendation selections from the visualization tool regarding the regions of uncertainty.

In one embodiment, process 400 may additionally include the feature that the code base in the original programming language and the code base of the target programming language are formatted in a side-by-side display of the visual interface (see, e.g., FIG. 1).

In one embodiment, process 400 may further include the feature that the violations are lint violations.

In one embodiment, process 400 may still further include the feature that each line of the code base of the code in the target programming language includes a confidence indication (see, e.g. model confidences 320, FIG. 3) from an artificial intelligence model.

In one embodiment, process 400 may additionally include the feature that each line of the code base of the target programming language that is flagged by the artificial intelligence model for a lint violation includes a lint violation indication (see, e.g., lint violations 310, FIG. 3.)

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
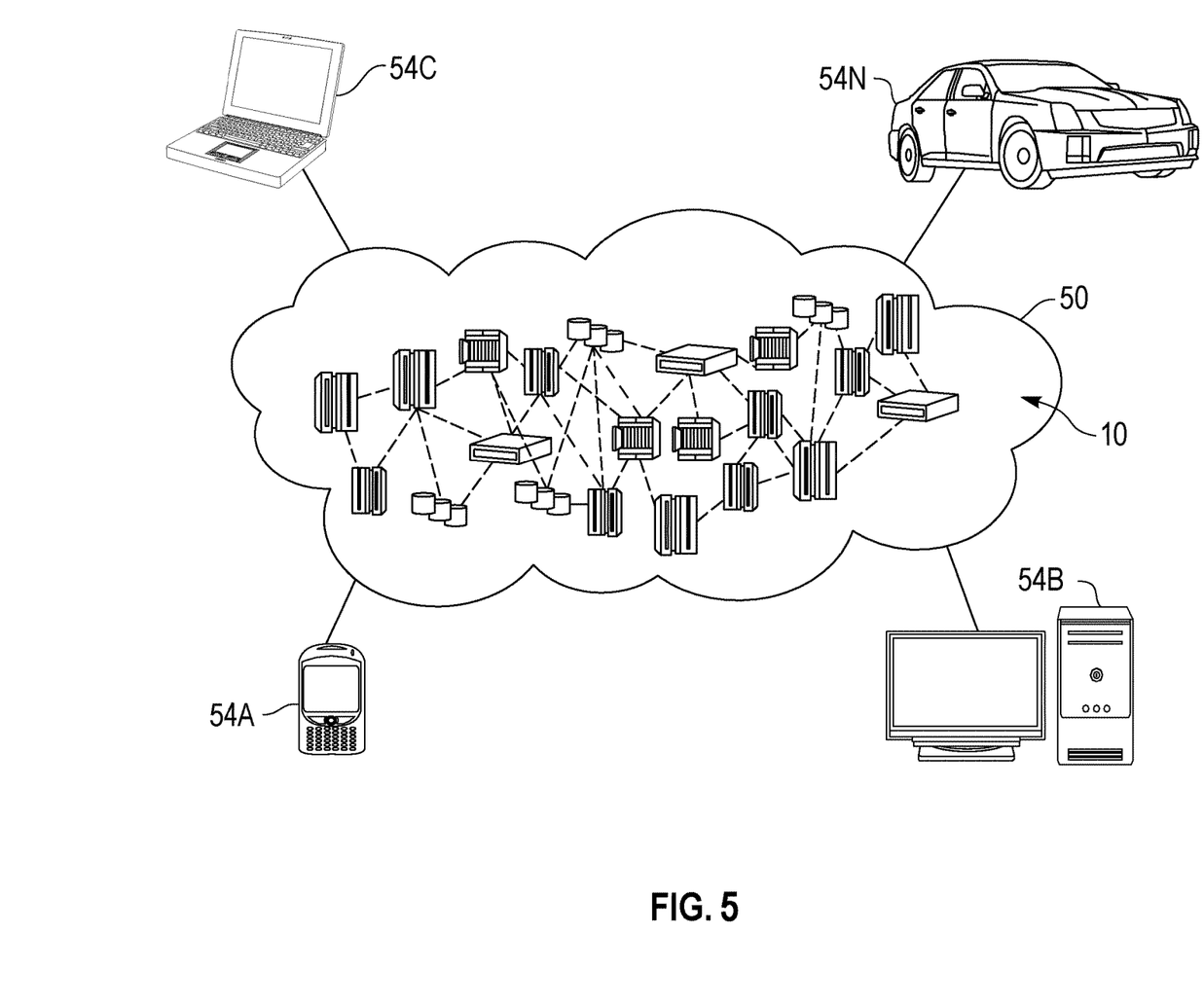
FIG. 5 depicts a cloud computing environment, according to an embodiment.

Referring now to FIG. 5 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
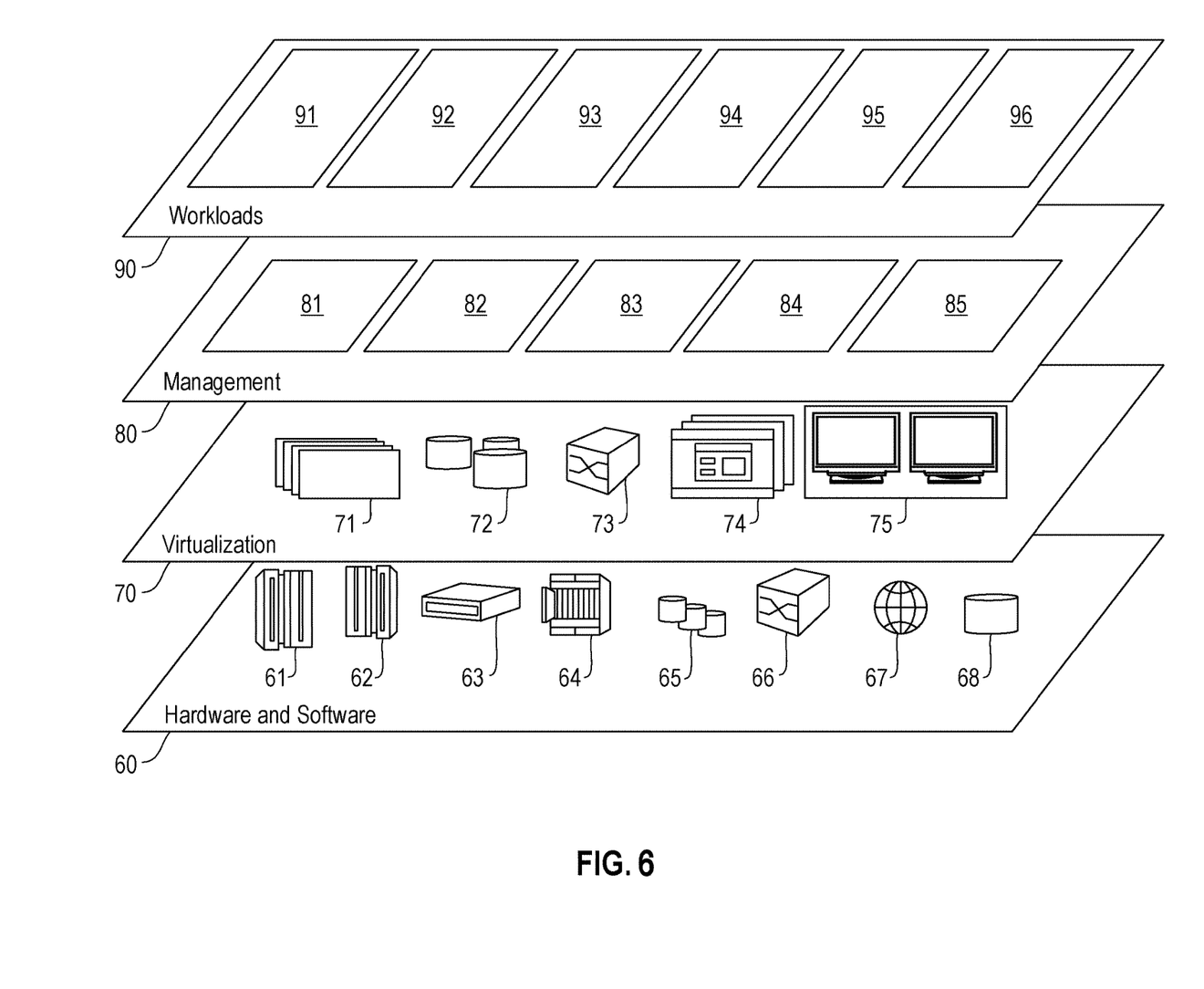
FIG. 6 depicts a set of abstraction model layers, according to an embodiment.

Referring now to FIG. 6, a set of functional abstraction layers provided by the cloud computing environment 50 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for using AI that provides source code from an original programming language to a target programming language showing regions of low confidence processing 96 (see, e.g., process 400, FIG. 4, system 700, FIG. 7, system 800, FIG. 8, system 900, FIG. 9, etc.). As mentioned above, all of the foregoing examples described with respect to FIG. 6 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 7:
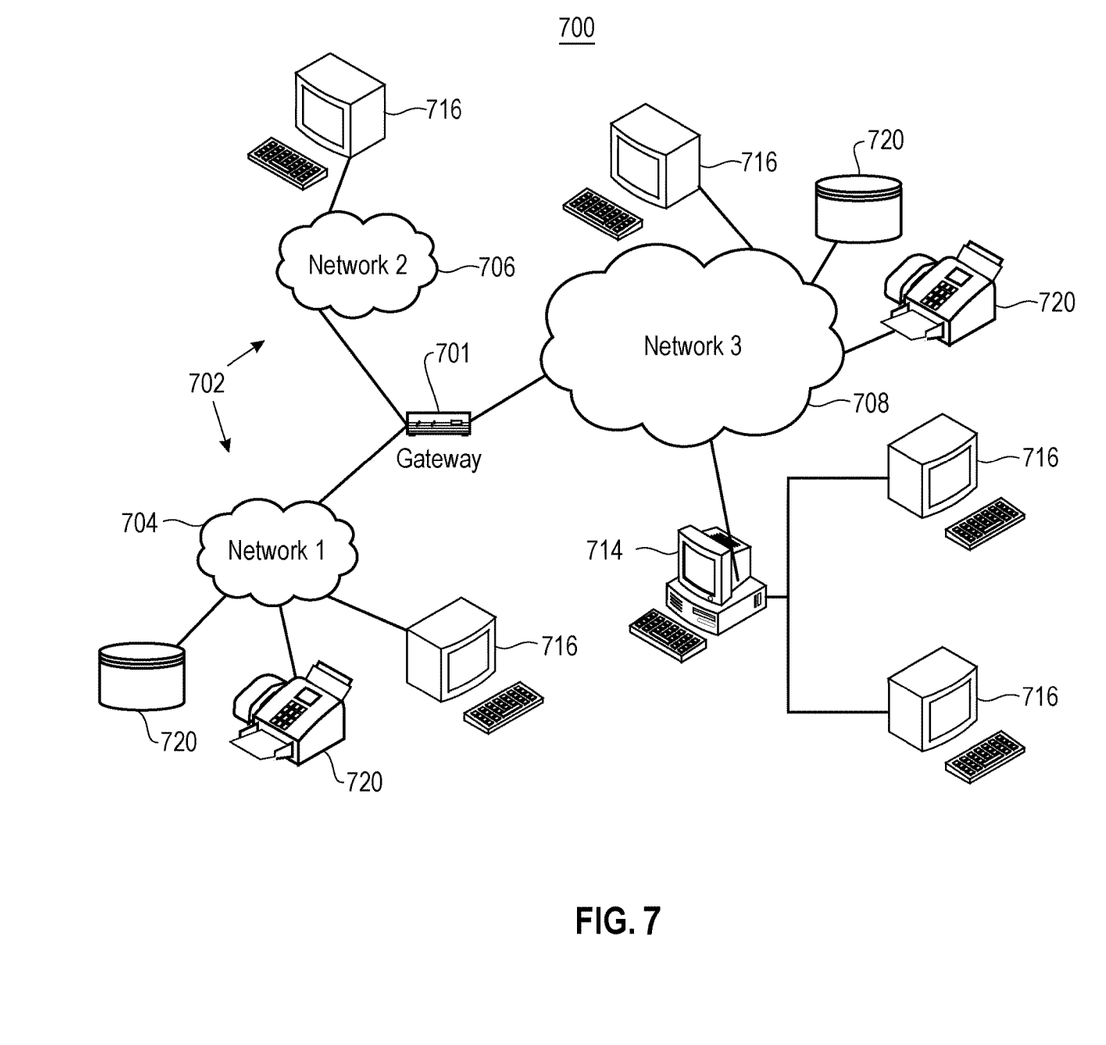
FIG. 7 is a network architecture of a system for using AI that provides source code from an original programming language to a target programming language showing regions of low confidence, according to an embodiment.

FIG. 7 is a network architecture of a system 700 for using AI that provides source code from an original programming language to a target programming language showing regions of low confidence, according to an embodiment. As shown in FIG. 7, a plurality of remote networks 702 are provided, including a first remote network 704 and a second remote network 706. A gateway 701 may be coupled between the remote networks 702 and a proximate network 708. In the context of the present network architecture 700, the networks 704, 706 may each take any form including, but not limited to, a LAN, a WAN, such as the Internet, public switched telephone network (PSTN), internal telephone network, etc.

In use, the gateway 701 serves as an entrance point from the remote networks 702 to the proximate network 708. As such, the gateway 701 may function as a router, which is capable of directing a given packet of data that arrives at the gateway 701, and a switch, which furnishes the actual path in and out of the gateway 701 for a given packet.

Further included is at least one data server 714 coupled to the proximate network 708, which is accessible from the remote networks 702 via the gateway 701. It should be noted that the data server(s) 714 may include any type of computing device/groupware. Coupled to each data server 714 is a plurality of user devices 716. Such user devices 716 may include a desktop computer, laptop computer, handheld computer, printer, and/or any other type of logic-containing device. It should be noted that a user device 716 may also be directly coupled to any of the networks in some embodiments.

A peripheral 720 or series of peripherals 720, e.g., facsimile machines, printers, scanners, hard disk drives, networked and/or local storage units or systems, etc., may be coupled to one or more of the networks 704, 706, 708. It should be noted that databases and/or additional components may be utilized with, or integrated into, any type of network element coupled to the networks 704, 706, 708. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WiNDOWS® environment, a MICROSOFT® WINDOWS® system that emulates an IBM® z/OS environment, etc. This virtualization and/or emulation may be implemented through the use of VMWARE® software in some embodiments.

Figure 8:
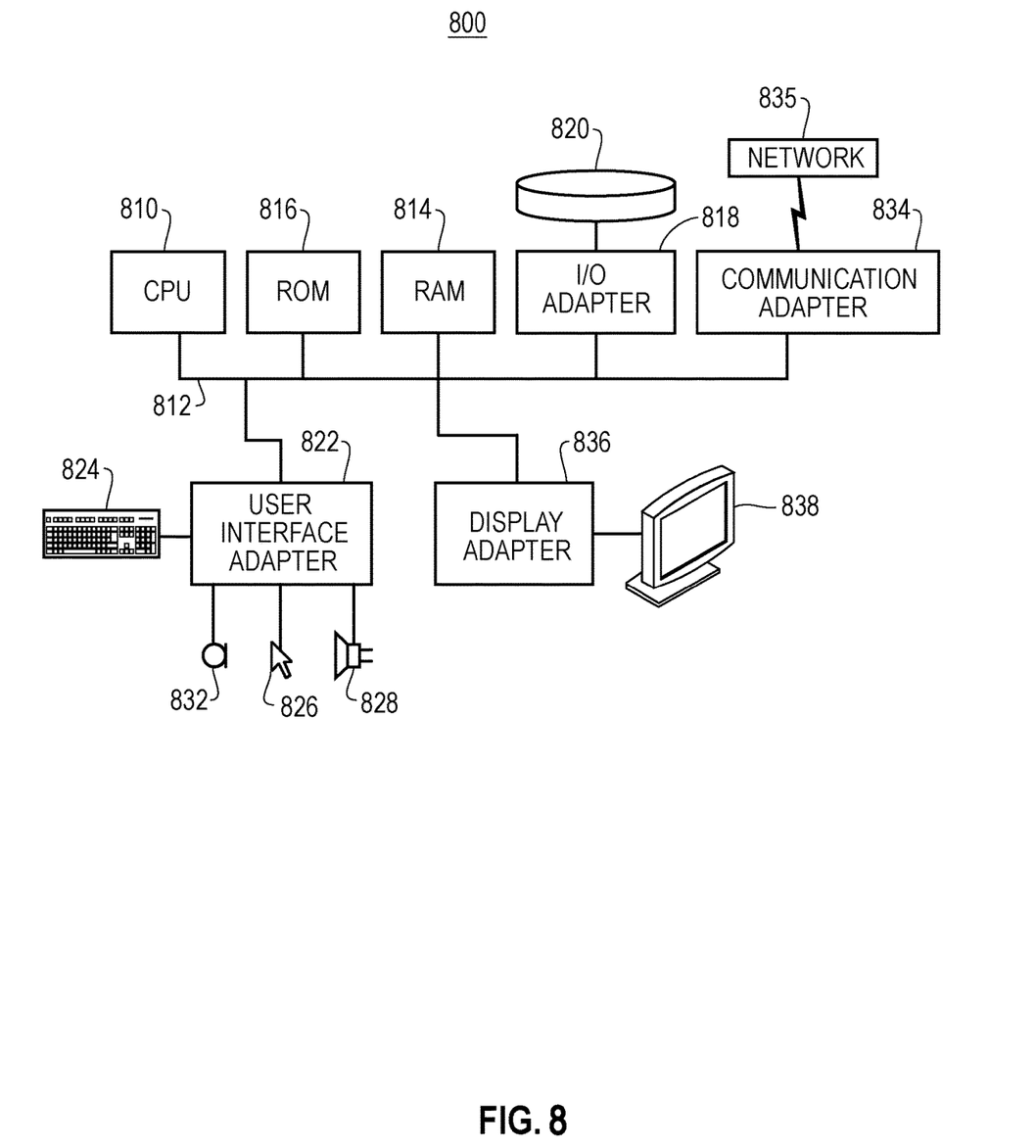
FIG. 8 shows a representative hardware environment that may be associated with the servers and/or clients of FIG. 5, according to an embodiment.

FIG. 8 shows a representative hardware system 800 environment associated with a user device 716 and/or server 714 of FIG. 7, in accordance with one embodiment. In one example, a hardware configuration includes a workstation having a central processing unit 810, such as a microprocessor, and a number of other units interconnected via a system bus 812. The workstation shown in FIG. 8 may include a Random Access Memory (RAM) 814, Read Only Memory (ROM) 816, an I/O adapter 818 for connecting peripheral devices, such as disk storage units 820 to the bus 812, a user interface adapter 822 for connecting a keyboard 824, a mouse 826, a speaker 828, a microphone 832, and/or other user interface devices, such as a touch screen, a digital camera (not shown), etc., to the bus 812, communication adapter 834 for connecting the workstation to a communication network 835 (e.g., a data processing network) and a display adapter 836 for connecting the bus 812 to a display device 838.

In one example, the workstation may have resident thereon an operating system, such as the MICROSOFT® WINDOWS® Operating System (OS), a MAC OS®, a UNIX® OS, etc. In one embodiment, the system 800 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

Figure 9:
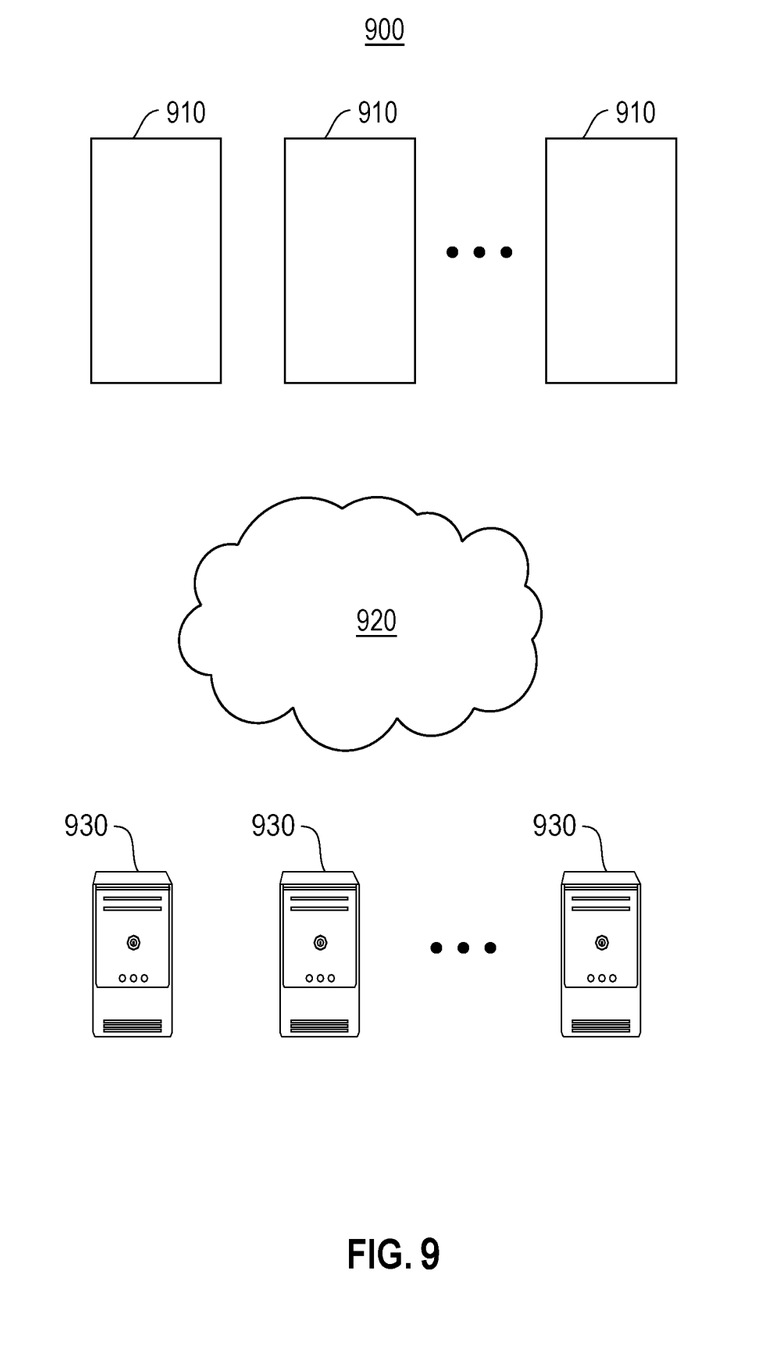
FIG. 9 is a block diagram illustrating a distributed system for using AI that provides source code from an original programming language to a target programming language showing regions of low confidence, according to one embodiment.

FIG. 9 is a block diagram illustrating a distributed system 900 for using AI that provides source code from an original programming language to a target programming language showing regions of low confidence, according to one embodiment. In one embodiment, the system 900 includes client devices 910 (e.g., mobile devices, smart devices, computing systems, etc.), a cloud or resource sharing environment 920 (e.g., a public cloud computing environment, a private cloud computing environment, a data center, etc.), and servers 930. In one embodiment, the client devices 910 are provided with cloud services from the servers 930 through the cloud or resource sharing environment 920.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method of using artificial intelligence to provide source code from an original programming language in a target programming language showing regions of low confidence, the method comprising:
   receiving, by a computing device, a code base in an original programming language;
   providing, by the computing device, the code base in the original programming language to a target programming language using an artificial intelligence tool;
   displaying, by the computing device, the code base in the target programming language using a visualization tool in a visual interface; and
   displaying further, by the computing device, the regions of uncertainty to a human user in the visual interface, wherein the regions of uncertainty provide the regions of low confidence of the target programming language for targeted user intervention, and the regions of low confidence correlate with violations to provide displayed actionable insight regions.

2. The method of claim 1, further comprising:
   receiving, by the computing device, recommendation selections from the visualization tool regarding the regions of uncertainty.

3. The method of claim 2, further comprising:
   displaying, by the computing device, an updated code base in the targeted programming language to the visual interface considering the received recommendation selections from the visualization tool regarding the regions of uncertainty.

4. The method of claim 1, wherein the code base in the original programming language and the target programming language are formatted in a side-by-side display of the visual interface.

5. The method of claim 1, wherein the violations are lint violations.

6. The method of claim 4, wherein each line of the code base in the target programming language includes a confidence indication from an artificial intelligence model.

7. The method of claim 6, wherein each line of the code base of the target programming language that is flagged by the artificial intelligence model for a lint violation includes a lint violation indication.

8. A computer program product for using artificial intelligence to provide source code from an original programming language in a target programming language showing regions of low confidence, the computer program product comprising a computer readable storage medium having program instructions embodied therewith, the program instructions executable by a processor to cause the processor to:
 receive, by the processor, a code base in an original programming language;
 provide, by the processor, the code base in the original programming language to a target programming language using an artificial intelligence tool;
 display, by the processor, the code base in the target programming language using a visualization tool in a visual interface; and
 display further, by the processor, the regions of uncertainty to a human user in the visual interface, wherein the regions of uncertainty provide the regions of low confidence in the target programming language for targeted user intervention, and the regions of low confidence correlate with violations to provide displayed actionable insight regions.

9. The computer program product of claim 8, wherein the program instructions executable by the processor further cause the processor to:
 receive, by the processor, recommendation selections from the visualization tool regarding the regions of uncertainty.

10. The computer program product of claim 9, wherein the program instructions executable by the processor further cause the processor to:
 display, by the processor, an updated code base in the targeted programming language to the visual interface considering the received recommendation selections from the visualization tool regarding the regions of uncertainty.

11. The computer program product of claim 8, wherein the code base in the original programming language and the code base of the target programming language are formatted in a side-by-side display of the visual interface.

12. The computer program product of claim 8, wherein the violations are lint violations.

13. The computer program product of claim 11, wherein each line of code of in the target programming language includes a confidence indication from an artificial intelligence model.

14. The computer program product of claim 13, wherein each line of code in the target programming language that is flagged by the artificial intelligence model for a lint violation includes a lint violation indication.

15. An apparatus comprising:
 a memory configured to store instructions; and
 a processor configured to execute the instructions to:
  receive a code base in an original programming language;
  provide the code base in the original programming language in a target programming language using an artificial intelligence tool showing regions of low confidence;
  display the code base in the target programming language using a visualization tool in a visual interface; and
  display further the regions of uncertainty to a human user in the visual interface, wherein the regions of uncertainty provide the regions of low confidence for the target programming language for targeted user intervention, and the regions of low confidence correlate with violations to provide displayed actionable insight regions.

16. The apparatus of claim 15, wherein processor is further configured to execute the instructions to:
 receive recommendation selections from the visualization tool regarding the regions of uncertainty.

17. The apparatus of claim 16, wherein processor is further configured to execute the instructions to:
 display an updated visual for the target programming language to the visual interface considering the received recommendation selections from the visualization tool regarding the regions of uncertainty.

18. The apparatus of claim 17, wherein the code base in the original programming language and the code base of the target programming language are formatted in a side-by-side display of the visual interface.

19. The apparatus of claim 15, wherein the violations are lint violations.

20. The apparatus of claim 18, wherein:
 each line of code in the target programming language includes a confidence indication from an artificial intelligence model; and
 each line of code in the target programming language that is flagged by the artificial intelligence model for a lint violation includes a lint violation indication.

\* \* \* \* \*